United States Patent Office 3,110,746
Patented Nov. 12, 1963

3,110,746
OXIDATIVE DEHYDROGENATION OF MONOOLEFINS

Hervey H. Voge, Berkeley, Warren E. Armstrong, Lafayette, and Lloyd B. Ryland, El Cerrito, Calif., assignors to Shell Oil Company, New York, N.Y., a corporation of Delaware
No Drawing. Filed May 26, 1961, Ser. No. 112,788
9 Claims. (Cl. 260—680)

This invention relates to the catalytic dehydrogenation of hydrocarbons, particularly olefins, which is particularly useful for the production of butadiene and isoprene.

A widely used commercial process for the production of butadiene and isoprene involves the catalytic dehydrogenation of n-butylene and isoamylenes with an iron oxide catalyst promoted with sizeable amounts of potassium carbonate and generally a small amount of chromium oxide. This process requires that the dehydrogenation be effected in the presence of a large excess of steam. Although the patent literature indicates steam to olefin mole ratios as low as 1:1, it is well known that much higher ratios are required for efficient operation. In commercial practice this ratio is above at least 8:1 and generally around 12:1.

In all the commercial dehydrogenation processes currently used relatively high reaction temperatures are required. The range used commercially generally falls between about 590 and 650° C. At these high temperatures and in the presence of the large amounts of steam the activity of the catalyst, such as iron oxide, is maintained by the continuous removal of carbonaceous deposits therefrom by the steam-carbon reaction which is catalyzed by the potassium carbonate in such catalyst. Thus the potassium carbonate is an essential ingredient therein.

An important factor in the production of butadiene and/or isoprene by dehydrogenation is the selectivity of the dehydrogenation process. The percent selectivity is defined as 100 times the moles of desired product produced divided by the moles of feed stock destroyed or otherwise converted. In order to obtain a reasonable selectivity the prior commercial process requires the use of low pressures. Generally pressures between about 5 and 25 p.s.i.a. are used. This necessitates large equipment and complicates the recovery of the product. At these low pressures and under otherwise near optimum conditions, a selectivity around 80% may be obtained at a total conversion around 20% in the dehydrogenation of butylene to butadiene. The operations are sometimes conducted under conditions of temperature and space velocity to obtain conversions as high as about 35%, but generally somewhat lower conversions are preferred because the selectivity drops sharply as the conversion is increased. At 40% conversion the selectivity may be only 50–60%. Thus, one of the major shortcomings of the iron oxide-potassium carbonate catalytic process is that the conversion must be limited to quite low values (about 25%) and this requires the working up of large amounts of material to recover the product and requires a sizeable recycle which further increases the size of the equipment.

One of the reasons for the inability of the iron-oxide-potassium carbonate catalytic commercial process to operate at higher conversion is that the reaction which (for the production of butadiene from butene-1) may be illustrated as follows:

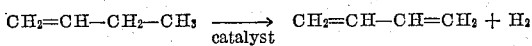

is inhibited by the hydrogen liberated. If the hydrogen were removed much higher conversions could be used.

One further shortcoming of the iron oxide-potassium carbonate catalytic commercial process is that due to the content of potassium carbonate in the catalyst, the catalyst is very hygroscopic and becomes soft if exposed to the atmosphere. This introduces difficulties in loading the reactors and also other inconveniences.

Another process recently discovered involves an oxidative dehydrogenation of aliphatic monoolefins through the use of certain catalytic materials such as, for example, bismuth-containing oxygenated composites, to wit, bismuth phosphate, bismuth tungstate, and the like, in the presence of added oxygen generally in the form of an oxygen-containing gas such as air. However, the reaction temperatures for such processes with those catalysts are still rather high, as for example, 500° C. to 600° C., with the resulting inherent disadvantages of such high-temperature reaction conditions, particularly for exothermic oxidation reactions.

The object of the present invention is to provide a new and improved process for the catalytic dehydrogenation of aliphatic olefins, both acyclic and alicyclic, which contain at least four non-quaternary contiguous carbon atoms, such as normal butylene, isoamylenes, cyclopentene, and similar higher olefins having up to 6 and 7 carbon atoms, to corresponding polyolefins, including diolefins.

In general outline, the present invention provides a process in which a vaporized feed stream containing the olefin reactant to be dehydrogenated is contacted together with certain specified amounts of oxygen and preferably, but not necessarily, a small amount of added steam at comparatively low temperatures between about 250 and 500° C. with a catalytic material containing a bismuth-iron compound, to be described in greater detail hereinafter, whereby the olefin is dehydrogenated to a polyolefin, such as butene-1 and butene-2 to butadiene-1,3.

The present invention provides or possesses one or more of the following advantages.

(1) The process may be operated with comparatively little or no steam while retaining the activity of the catalyst at a high level.

(2) The process may be operated at considerably lower temperatures, e.g., as much as 150° C. lower. Whereas it is important to quickly quench the reaction product from the quite high reaction temperature to a safe temperature in the iron oxide-potassium carbonate catalytic commercial process, such immediate quench is not essential in the process of the present invention where much lower temperatures can be used.

The advantages of being able to operate the process at such reduced temperatures are numerous. The reaction is exothermic and at operating temperatures below say 400° C. serious problems relating to the provision and maintenance of suitable cooling means for the reaction are largely overcome. Moreover, when operating the process at below about 400° C., many undesirable side reactions that can occur in the preheating and quenching zones are eliminated, thereby increasing process efficiency and improving the final product quality.

(3) Potassium carbonate is not an essential ingredient in the catalyst and in fact its presence is not recommended. Consequently the difficulties due to hygroscopicity of the catalyst are avoided.

(4) The process may be effected at comparatively higher pressures, thereby allowing smaller equipment to be used and facilitating the recovery of the product.

(5) The process may be operated at higher conversions without sacrifice of the selectivity.

FEED STOCK

The process of the present invention is principally of value at present for the dehydrogenation of normal butylenes to butadiene and/or isoamylenes, especially tertiary amylenes, to isoprene but it can also be used to dehydrogenate cyclopentene to cyclopentadiene, normal amylene to piperylene and higher olefins, e.g., hexenes and heptenes, to the corresponding more unsaturated products. The normal butylene may be butene-1 or butene-2, either cis or trans, or a mixture of normal butylenes such, for example, as can be separated from the products obtained in the cracking of petroleum oils or by the catalytic dehydrogenation of normal butane. The tertiary amylene may be any one or a mixture of the amylenes having one tertiary carbon atom. The feed stock may contain inert diluents such as any paraffinic or naphthenic hydrocarbon having up to about 10 carbon atoms.

One of the principal features of advantage of the present invention is that considerable amounts of propylene and isobutylene may be present in the feedstock, thereby eliminating the requirement for separating the feed stream to remove these hydrocarbons therefrom. It will be appreciated that although the catalytic material of the present invention does not produce any substantial amount of oxygenated organic materials under the conditions specified herein, it is nevertheless advantageous to maintain materials which may act only as inert diluents at a reasonable minimum for economic reasons.

STEAM

The feed stock is preferably catalytically dehydrogenated in the presence of added steam, but it is to be emphasized that the presence of added steam is only a small benefit and is not essential. Recommended proportions of steam are from about 0.1 to 2 moles per mole of reactant, but as indicated, larger amounts can be used if desired and, on the other hand, steam can be altogether omitted.

OXYGEN

In the process of the present invention a certain amount of oxygen is passed with the feed stock through the reaction zone. Recommended amounts are from about 0.3 to 2.0 moles per mole of olefin reactant. The stoichiometric quantity is 0.5 mole per mole of olefin. It is preferred to use a stoichiometric excess, e.g., around 1 mole per mole of olefin. The oxygen may be supplied as pure or substantially pure oxygen, or air.

It is generally preferred to maintain the concentration of oxygen in the reactant mixture entering the reactor below about 12 v. percent, although somewhat higher concentrations may be used if the concentration of the olefin reactant is at least about 10 v. percent when operating at 30 p.s.i.g., at least 15 v. percent when operating at 100 p.s.i.g. and at least about 20 v. percent when operating at 300 p.s.i.g. Thus when using pure oxygen it is frequently desirable to dilute the mixture with an inert or substantially inert diluent which may be steam, vapors of paraffin hydrocarbons, $CO_2$, or the like. On the other hand, if the amount of oxygen is such that it would constitute more than about 12 v. percent of the reaction mixture the oxygen may be introduced in increments, e.g., by injecting part of the oxygen separately into the reaction zone.

TEMPERATURE

With the preferred catalyst the dehydrogenation becomes substantial at a minimum temperature around 250° C. The preferred temperatures are between about 300° C. and 500° C. Higher temperatures up to about 600° C. can be used, but only if sufficient means are provided to remove the exothermic heat of reaction. The temperatures mentioned are the maxima in the catalyst bed. If a fixed bed of catalyst is used the temperature near the inlet will be considerably lower, e.g., 50° C. or so lower.

PRESSURE

The preferred pressure is near atmospheric, e.g., 5 to 75 p.s.i.a. On the other hand, higher pressures up to about 150 p.s.i.a. can be used and have the advantage of simplifying the product recovery.

SPACE VELOCITY

In general, the process of the present invention allows a higher space velocity to be used. Thus, comparatively small reactors and catalyst inventories can be used. For example, gaseous hourly space velocities up to about 20,000 may be employed while still obtaining reasonable conversions. Gaseous hourly space velocity, abbreviated GHSV, is defined as the volume of total feed vapor calculated under standard condition (STP) passed per hour per unit volume of the catalyst bed. A wide range of space velocities may be used. Generally space velocities between about 500 and 5000 are very satisfactory. Temperature, pressure, and space velocity should be jointly adjusted to obtain a conversion in the most favorable range, normally 40–90%.

METHOD OF CONTACT

The contact of the feed vapors, oxygen and steam, if any, is preferably effected by providing the catalyst in the form of a fixed foraminous bed of particles maintained at the reaction temperature and passing the feed vapors through the bed in a continuous or substantially continuous manner. In this method of operation the partial pressure of oxygen is high (maximum) at the inlet of the catalyst bed and declines toward the outlet. The concentration of diolefin product, on the other hand, is substantially zero at the inlet of the bed and maximum at the outlet. Thus, the concentration of oxygen is highest where the concentration of the desired product is lowest and the concentration of oxygen is lowest where the concentration of the desired product is highest.

Since it is also possible to use the catalyst in powder form, as for example, as a material passing a 100-mesh U.S. standard sieve, it can be dispersed in the reactant vapor mixture and the dispersion passed through the reaction zone. Alternatively, the reactant vapor mixture may be passed up through a fluidized bed of the catalyst. In such case the oxygen may be separately introduced into the bed.

The gaseous mixture issuing from the reaction zone may be quenched but this is normally not essential. Except in some cases when operating at the upper limit of the recommended temperatures there is little tendency for side reactions to take place. The effluent is preferably cooled by indirect heat exchange with the feed and then washed with dilute caustic to neutralize the traces of organic acid present and condense and remove the steam. If air is used to supply the oxygen the remaining mixture is preferably compressed and scrubbed with oil to separate the hydrocarbons from the nitrogen, carbon dioxide, and carbon monoxide. The hydrocarbon may be stripped from the oil and subjected to an extractive distillation or a copper ammonium acetate treatment in the known manner to separate and recover the diolefin.

CATALYST

The catalyst used in the process of the present invention differs materially from either the prior iron oxide dehydrogenation catalyst, as well as from the previous bismuth-containing oxidative dehydrogenation catalysts. Moreover, a combination of the previous iron oxide and bismuth-containing catalysts does not produce the particular catalytic material nor results of this invention, as will be more fully appreciated from a consideration of the following description. Also, the catalyst used in the process of the present invention preferably contains no potassium carbonate, or the equivalent thereof, and the process does not depend at all upon the steam-carbon reaction to maintain catalyst activity. Continuous processing is not only possible in utilizing the present invention but is strongly recommended.

The catalytic material useful in the dehydrogenation process of the present invention comprises a composition of material having desirable catalytic activity for the oxidative dehydrogenation of olefin and consists essentially of bismuth, iron, oxygen, and an element selected from the group consisting of phosphorus, molybdenum and tungsten in combined form. A preferred composition of matter having catalytic effect in the oxidative dehydrogenation reaction described herein is a bismuth-iron composite which also includes as an essential ingredient thereof the additional elements aforesaid, to wit, oxygen and phosphorus, molybdenum, or tungsten. Moreover, it has been found that various combinations of phosphorus, molybdenum, and tungsten can be employed to advantage in the bismuth-iron composite and the catalytically active material need not be limited to the incorporation by one or even two of these particular elements. Whereas the designation bismuth-iron composite is used to indicate one of the preferred catalytically active materials in the present invention, the composition may vary considerably and can be appropriately represented by the following formula: $x$Bi, Fe, $y$E, $z$O, wherein $x$ representing the number of bismuth atoms, may vary from 0.5 to 12, $y$ usually varies from 1 to 12, and $z$, representing the number of oxygen atoms, may vary over wide limits, as for example from 3 to 60. E represents either phosphorus, molybdenum, or tungsten, or a combination thereof in no particularly preferred relationship. For example, a preferred catalyst of the present invention comprises a bismuth-iron composite having the following composition: 2Bi, Fe, 3P, ZO. In such representative composite the amount of oxygen present is visualized as being integral for the most part as $PO_4$ radicals, but it may be in part present as oxide, and the amount in an operating catalyst will depend on the conditions of use. For this reason, in the following examples, we do not show the amount of oxygen but only the ratios of the other atoms. Other catalytically active materials based upon the bismuth-iron composite will be found useful in practicing the present invention as exemplified in Table I, appended hereinafter. In Table I it will be noted that catalysts 1 through 4 comprise iron phosphate, bismuth phosphate, iron molybdate and bismuth iron oxide, respectively. The data relative to these four catalytic materials, prepared in similar manner to the catalysts of the invention, are set forth herein for the purpose of comparison with the improved results obtained from the bismuth-iron composite catalysts of the present invention; the four tabulated catalysts (Nos. 1 through 4) not constituting a part of the present invention. Moreover, other phosphates, molybdates, or tungstates may be present without deleterious effect, such materials probably functioning principally as inert supporting media.

*Table I*

OXIDATIVE DEHYDROGENATION OF 1-BUTENE TO BUTADIENE

[Tests at atmospheric pressure with a feed mixture containing 17% 1-$C_4H_8$, 17% $O_2$, 66% argon, passed at 3600 total GHSV]

| No. | Composition (+ Oxygen) | Max. Temp., °C. | Conversion of Monoolefin, Percent | Selectivity to Diolefin, Percent |
|---|---|---|---|---|
| 1 | Fe, P | 455 | 38 | 57 |
| 2 | Bi, P | 500 | 65 | 80 |
| 3 | 2Fe, 3Mo | 445 | 33 | 47 |
| 4 | Bi, Fe | 470 | 27 | 2 |
| 5 | Bi, Fe, P | 365 | 71 | 82 |
| 6 | Bi, Fe, 2P | 400 | 71 | 84 |
| 7 | 2Bi, Fe, 3P | 350 | 80 | 83 |
| 8 | 4Bi, 2Fe, 9W | 435 | 46 | 72 |
| 9 | 4Bi, 2Fe, 9Mo | 390 | 62 | 78 |
| 10 | 2Bi, Fe, 3Mo | 405 | 62 | 80 |
| 11 | 2Bi, Fe, 2Mo | 400 | 63 | 83 |

Various means for the preparation of the catalytic materials of the present invention may be employed and the following are offered for purposes of exposition while various modifications thereof are contemplated without departure from the spirit and scope of the invention.

In general, solutions of ammonium phosphate $$[(NH_4)_3PO_4, (NH_4)_2HPO_4 \text{ or } (NH_4)H_2PO_4]$$

may be added to an acidic solution containing both bismuth nitrate and ferric nitrate or other soluble bismuth and iron salts. Ammonia may then be added to complete the reaction. As an alternative, ammonia may be added to a solution containing soluble bismuth and iron salts and phosphoric acid. The precipitate formed by this reaction is collected as a filter cake which may or may not be washed and is then dried and calcined. Other methods may be used, such as the heating together of bismuth nitrate, ferric nitrate and phosphoric acid or an ammonium phosphate. The iron may also be added as hydrated oxide, as carbonate, or as oxalate. Still other methods will occur to one skilled in the art. Moreover, ammonium molybdate and ammonium tungstate may be used in place of ammonium phosphate.

It is to be understood that the invention also contemplates the use of mixtures or combinations of these bismuth-iron composite catalytically active materials such as, for example 2Bi, Fe, 3P + Bi, Fe, Mo.

The modus operandi of the catalyst is unknown and no explanation of its very pronounced activity and selectivity as low temperatures can be offered at this time. Its specificity for oxidative dehydrogenation of hydrocarbons, particularly olefins to diolefins, is especially advantageous.

The catalyst may be used with or without a filler or carrier material and may be pelleted or formed in other conventional manner. If a carrier is used it is preferably one having a good thermal conductivity and pores of relatively large size such, for instance, as pellets of Alundum, crushed fire brick, pumice, or the like. A filler or binding agent in an amount up to about 50% by weight of the total may be included. Suitable materials are, for example, silica, granular aluminum, and other inert materials.

EXAMPLE I 150 ml. of 1 molar $Fe(NO_3)_3$ and 150 ml. of 1 molar $Bi(NO_3)_3$ in 1 normal $HNO_3$ was diluted to 1.0 liter with 0.5 molar $HNO_3$. 150 ml. of 1 molar $(NH_4)_2HPO_4$ was added while stirring vigorously and then 199 ml. 6 normal $NH_4OH$ was added to pH 6. The precipitate formed by this combination was collected on a Büchner funnel and the solution removed. The precipitate was washed with 2 liters of distilled water and then dried at 115° C. The dry material was calcined for 2 hours at 500° C. and then broken down to 10–20 mesh granules for testing. The composition of the catalyst was Bi, Fe, P and oxygen. Table I shows the catalyst, No. 5, to convert 71% monoolefins with 82% selectivity to diolefins when tested at 365° C.

EXAMPLE II

This catalyst was prepared similarly to that of Example I except that 300 ml. instead of 150 ml. of 1 molar $(NH_4)_2HPO_4$ was added. 169 ml. of 6 normal $NH_4OH$ was added to pH 6. The composition of this catalyst was Bi, Fe, 2P and oxygen. Table I shows this catalyst, No. 6, to convert 71% monoolefin with 84% selectivity to diolefin when tested at 400° C.

EXAMPLE III 100 ml. of 1 molar $Fe(NO_3)_3$ and 200 ml. of 1 molar $Bi(NO_3)_3$ in 1 normal $HNO_3$ was diluted to 1.0 liter with distilled water. 1 liter of 2 molar $(NH_4)_2HPO_4$ was added slowly while mixing the preparation with a stirrer. The milky precipitate was collected on a Büchner funnel and the solution containing ammonium nitrate and excess ammonium phosphate was removed. The precipitate was washed with 2 liters of distilled water and then dried at 120° C. The dry material was calcined for 2 hours at 500° C. and then broken down to 10–20 mesh granules for testing. The composition of this catalyst was 2Bi, Fe, 3P and oxygen. Table I shows this catalyst, No. 7, to convert 80% monoolefins with 83% selectivity to diolefins when tested at 350° C.

EXAMPLE IV 100 ml. of 1 molar $Bi(NO_3)_3$ in 1 normal $HNO_3$, 50 ml. of 1 molar $Fe(NO_3)_3$ and 120 ml. of 3 normal $HNO_3$ was diluted to 0.67 liter with distilled water. A solution consisting of 1.07 liters 0.21 molar $(NH_4)_2WO_4$ and 75 ml. 6 normal $NH_4OH$ was added rapidly to pH 7 and then a small amount of $HNO_3$ was added to pH 6. The precipitate formed by this combination was collected on a Büchner funnel and the solution removed. The precipitate was washed with 1 liter of distilled water and then dried at 115° C. The dry material was calcined for 2 hours at 400° C. and then broken down to 10–20 mesh granules for testing. The composition of the catalyst was 4Bi, 2Fe, 9W and oxygen. Table I shows this catalyst, No. 8, to convert 46% monoolefins with 72% selectivity to diolefins when tested at 435° C.

EXAMPLE V 200 ml. of 1 molar $Bi(NO_3)_3$ in 1 normal $HNO_3$, 100 ml. of 1 molar $Fe(NO_3)_3$, and 114 ml. 3 normal $HNO_3$ was diluted to 0.67 liter with distilled water. A solution consisting of 450 ml. 1 molar $(NH_4)_2MoO_4$ and 150 ml. 6 molar $NH_4OH$ diluted to 1 liter was rapidly added to pH 7 and a small amount of $HNO_3$ was added to pH 6. The precipitate formed by this combination was collected on a Büchner funnel and the solution was removed. The precipitate was washed with 2 liters of distilled water and then dried at 115° C. The dry material was calcined for 2 hours at 500° C. and then broken down to 10–20 mesh granules for testing. The composition of the catalyst was 4Bi, 2Fe, 9Mo and oxygen. Table I shows this catalyst, No. 9, to convert 62% monoolefins with 78% selectivity to diolefins when tested at 390° C.

EXAMPLE VI 200 ml. of 1 molar $Bi(NO_3)_3$ in 1 normal $HNO_3$, 100 ml. 1 molar $Fe(NO_3)_3$, and 114 ml. 3 normal $HNO_3$ was diluted to 0.67 liter with distilled water. A solution consisting of 300 ml. 1 molar $(NH_4)_2MoO_4$ and 175 ml. 6 molar $NH_4OH$ was rapidly added to pH 7 and a small amount of $HNO_3$ was added to pH 6. The remainder of the preparation was similar to that of Example V. The composition of this catalyst was 2Bi, Fe, 3Mo. Table I shows this catalyst, No. 10, to convert 62% monoolefins with 80% selectivity to diolefin when tested at 405° C.

EXAMPLE VII 300 ml. of 1 molar $Bi(NO_3)_3$ in 1 normal $HNO_3$, 150 ml. 1 molar $Fe(NO_3)_3$ and 170 ml. 3 normal $HNO_3$ was diluted to 1 liter with distilled water. A solution consisting of 300 ml. 1 molar $(NH_4)_2MoO_4$ and 250 ml. 6 normal $NH_4OH$ diluted to 1 liter was rapidly added to pH 4.5 and a small amount of ammonia was added to pH 6. The precipitate was collected on a Büchner funnel, washed with 2 liters of distilled water and then dried at 115° C. The dry material was calcined for 2 hours at 500° C. and then broken down to 10–20 mesh granules for testing. The composition of the catalyst was 2Bi, Fe, 2Mo. Table I shows this catalyst, No. 11, to convert 63% monoolefins with 83% selectivity to diolefins when tested at 400° C.

EXAMPLE VIII

A stream containing 14% v. 2-methyl-2-butene, 14% v. oxygen, and 72% v. helium was passed at a gas hourly space velocity of 4200 over a catalyst prepared in the manner of Example III and having the composition of 2Bi, Fe, 3P and oxygen. The maximum reaction temperature was 375° C. and the conversion of the 2-methyl-2-butene was 47% with a selectivity of 62% to isoprene.

We claim as our invention:

1. Process for the selective catalytic oxidative dehydrogenation of a $C_{4-7}$ monoolefinic aliphatic hydrocarbon having no quaternary carbon atoms to produce as the major reaction product a hydrocarbon having the same number of carbon atoms but at least one more ethylenic double bond, which comprises passing the aliphatic hydrocarbon in vapor phase together with from about 0.3 to 2 moles of oxygen per mol of said olefinic hydrocarbon through a reaction zone in contact with a solid catalyst therefor consisting essentially of a composition of matter consisting essentially of bismuth, iron and oxygen containing from about 0.5 to about 12 atoms of bismuth and from about 1 to about 12 atoms of an element selected from the group consisting of phosphorus, molybdenum and tungsten for each atom of iron at a temperature of from about 250° C. to 600° C. and at a pressure of from about 3 to 150 p.s.i.a., whereby the second-mentioned hydrocarbon is formed as a reaction product.

2. Process for the selective catalytic oxidative dehydrogenation of a $C_{4-7}$ monoolefinic aliphatic hydrocarbon having no quaternary carbon atoms to produce as the major reaction product a hydrocarbon having the same number of carbon atoms but at least one more ethylenic double bond, which comprises passing the aliphatic hydrocarbon in vapor phase together with from about 0.3 to 2 moles of oxygen per mol of said olefinic hydrocarbon through a reaction zone in contact with a solid catalyst therefor consisting essentially of bismuth, iron and oxygen containing from about 0.5 to about 12 atoms of bismuth and from about 1 to about 12 atoms of an element selected from the group consisting of phosphorus, molybdenum and tungsten for each atom of iron at a temperature of from about 250° C. to 600° C. and at a pressure of from about 3 to 150° p.s.i.a., whereby the second-mentioned hydrocarbon is formed as a reaction product.

3. Process for the selective catalytic oxidative dehydrogenation of a $C_{4-7}$ monoolefinic aliphatic hydrocarbon having no quaternary carbon atoms to produce as the major reaction product a hydrocarbon having the same number of carbon atoms but at least one more ethylenic double bond, which comprises passing the first said hydrocarbon in the vapor phase together with about an equal molar amount of oxygen through a reaction zone in contact with a solid catalyst consisting essentially of bismuth, iron and oxygen containing from about 0.5 to about 12 atoms of bismuth and from about 1 to about 12 atoms of an element selected from the group consisting of phosphorus, molybdenum and tungsten for each atom of iron at a temperature of from about 250° C. to 500° C. and at a pressure of from about 5 to 150 p.s.i.a., whereby the second-mentioned hydrocarbon is formed as a reaction product.

4. Process for the selective oxidative catalytic dehydrogenation of a $C_{4-7}$ monoolefinic aliphatic hydrocarbon having no quaternary carbon atoms to a corresponding diolefin which comprises passing said hydrocarbon in the vapor phase together with from about 0.3 to 2 moles of oxygen per mol of said olefinic hydrocarbon through a reaction zone in contact with the solid catalyst consisting essentially of bismuth, iron and oxygen containing from about 0.5 to about 12 atoms of bismuth and from about 1 to about 12 atoms of an element selected from the group consisting of phosphorus, molybdenum and tungsten for each atom of iron at a temperature of from about 300° C. to 600° C., a pressure of from about 5 to 150 p.s.i.a., whereby the second-mentioned hydrocarbon is formed as a reaction product.

5. Process for the selective oxidative catalytic dehydrogenation of a $C_{4-7}$ monoolefinic aliphatic hydrocarbon having no quaternary carbon atoms to a corresponding diolefin which comprises passing said hydrocarbon in the vapor phase together with from about 0.3 to 2 moles of oxygen per mol of said olefinic hydrocarbon through a reaction zone in contact with a fixed foraminous bed of catalyst containing as its main active constituent a bismuth-iron composite consisting essentially of one atom of iron in combination with from about 0.5 to about 12 atoms of bismuth, about 1 to about 12 atoms of a member of the group consisting of phosphorus, molybdenum and tungsten, and from about 3 to about 60 atoms of oxygen, at a temperature of from about 300° C. to 600° C., a pressure of from about 5 to 150 p.s.i.a., whereby the second-mentioned hydrocarbon is formed as a reaction product.

6. Process for the selective oxidative catalytic dehydrogenation of a $C_{4-7}$ monoolefinic aliphatic hydrocarbon having no quaternary carbon atoms to a corresponding diolefin which comprises passing said hydrocarbon in the vapor phase together with an approximately equal molar quantity of oxygen through a reaction zone in contact with a solid catalyst consisting essentially of bismuth, iron and oxygen containing from about 0.5 to about 12 atoms of bismuth and from about 1 to about 12 atoms of an element selected from the group consisting of phosphorus, molybdenum and tungsten in catalytically effective proportions at a temperature of from about 300° to 600° C., a pressure of from about 5 to 150 p.s.i.a., whereby the second-mentioned hydrocarbon is formed as a reaction product.

7. Process for the selective oxidative catalytic dehydrogenation of a $C_{4-7}$ monoolefinic aliphatic hydrocarbon having no quaternary carbon atoms to a corresponding diolefin which comprises passing said hydrocarbon in the vapor phase together with air in an amount equivalent to from about 0.3 to 2 moles of oxygen per mol of said olefinic hydrocarbon through a reaction zone in contact with the solid catalyst consisting essentially of the combination of iron with bismuth, phosphorus and oxygen containing about 2 atoms of bismuth and about 3 atoms of phosphorus for each atom of iron, at a temperature of from about 300° C. to 600° C., a pressure of from about 5 to 150 p.s.i.a., whereby the second-mentioned hydrocarbon is formed as a reaction product.

8. Process for the selective oxidative catalytic dehydrogenation of a $C_{4-7}$ monoolefinic aliphatic hydrocarbon having no quaternary carbon atoms to a corresponding diolefin which comprises passing said hydrocarbon in the vapor phase together with from about 0.3 to 2 moles of oxygen per mol of said olefinic hydrocarbon through a reaction zone in contact with a solid catalyst consisting essentially of a combination of bismuth, iron, oxygen and phosphorus containing about 2 atoms of bismuth and about 3 atoms of phosphorus for each atom of iron at a temperature of from about 350° C. to 500° C., a pressure of from about 5 to 150 p.s.i.a., whereby the second-mentioned hydrocarbon is formed as a reaction product.

9. Process for the selective oxidative catalytic dehydrogenation of a $C_{4-7}$ monoolefinic aliphatic hydrocarbon having no quaternary carbon atoms to a corresponddiolefin which comprises passing said hydrocarbon in the vapor phase together with from about 0.3 to 2 moles of oxygen per mol of said olefinic hydrocarbon through a reaction zone in contact with a solid catalyst consisting essentially of bismuth, iron and oxygen containing from about 0.5 to about 12 atoms of bismuth and from about 1 to about 12 atoms of an element selected from the group consisting of phosphorus, molybdenum and tungsten for each atom of iron at a temperature of from about 350° C. to 500° C., and at about atmospheric pressure, whereby the second-mentioned hydrocarbon is formed as a reaction product.

References Cited in the file of this patent

UNITED STATES PATENTS

| | | |
|---|---|---|
| 2,991,320 | Hearne et al. | July 4, 1961 |
| 2,991,321 | Voge et al. | July 4, 1961 |
| 2,991,322 | Armstrong et al. | July 4, 1961 |